George F. Nurenberg
& John Campbell
INVENTORS

BY Carl Miller
ATTORNEY

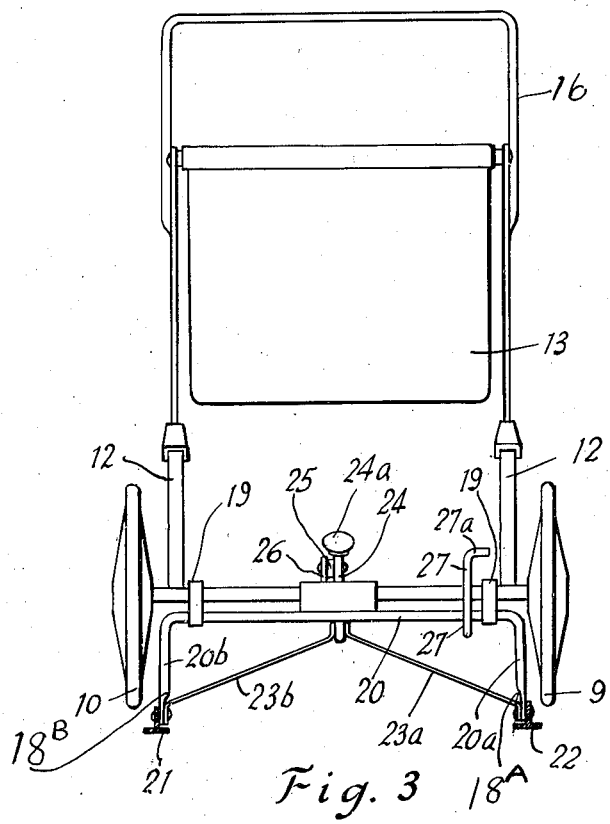
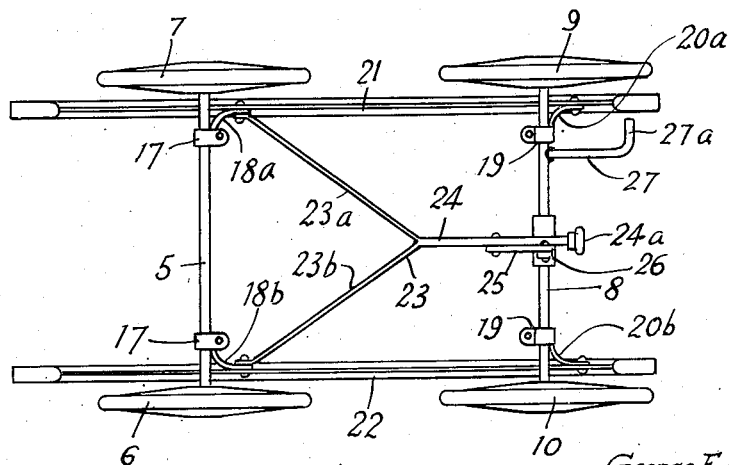

Patented Aug. 30, 1949

2,480,256

UNITED STATES PATENT OFFICE 2,480,256

FOLDING SLED RUNNERS FOR BABY CARRIAGES AND THE LIKE

George F. Nurenberg, Trenton, and John Campbell, Florence, N. J., assignors of thirty-three and one-third per cent to Leon M. Seidel, Bordentown, N. J.

Application May 2, 1946, Serial No. 666,686

1 Claim. (Cl. 280—9)

This invention relates to an improved sled attachment for baby buggy constructions of all types, including baby carriages, strollers, or doll carriages, or for other wheeled vehicles, and one of its objects is to provide a pair of sled runners and folding mechanism for supporting the runners under the vehicle in an inoperative position, or extended below the body of the vehicle so as to provide the active ground support for the vehicle, so that the device can be used to convert the wheeled vehicle into a sled vehicle, or the runners may be brought into friction engagement with the ground to serve as emergency brakes to prevent the vehicle from rolling down an incline or being pushed into a dangerous road position, and also to be used as a non-tilting device when the vehicle is not in motion.

A further object of the invention is to provide folding mechanism for the sled runners which will be of simple construction, and permit of operation from one end of the wheeled vehicle, by a pushing and pulling action on a single bar.

With the above and other objects in view, the invention comprises certain new and useful constructions, combinations and arrangements of parts, clearly described in the following specification and fully illustrated in the drawings, in which Fig. 1 is a side elevation, partly in section, showing the runners in ground engaged position.

Fig. 3 is a rear elevation, with the runners in sled position, the latter shown in section.

Fig. 4 is a top plan view of the frame, showing the vehicle top removed.

Figure 1:
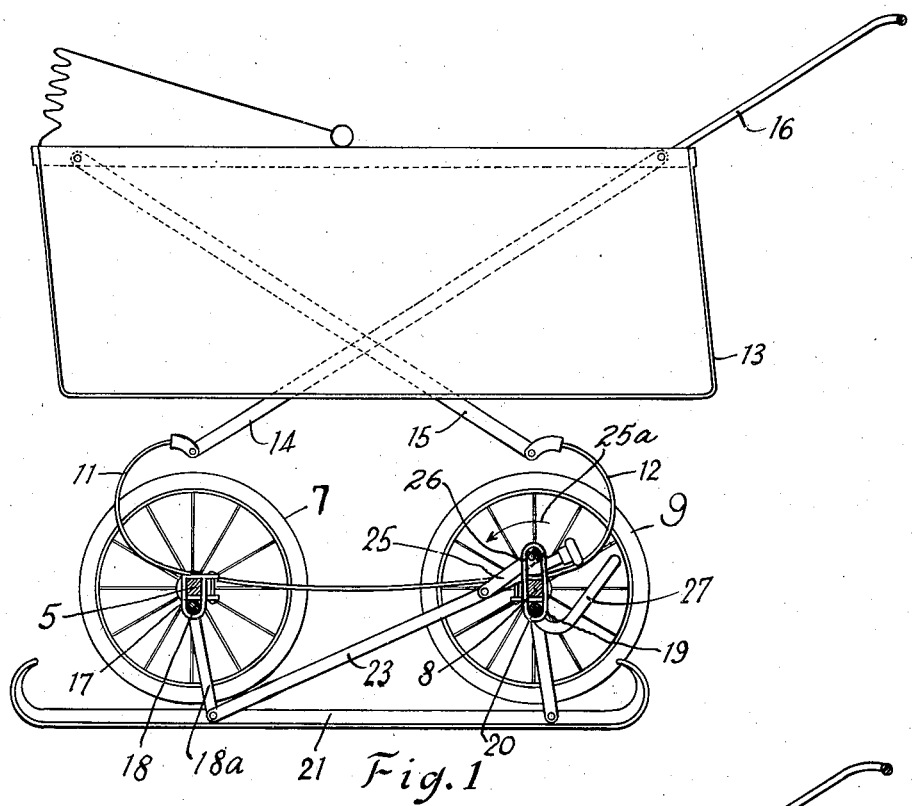

Referring to the drawings, which illustrate the practical embodiment of the invention, 5 designates the front axle, on the ends of which the ground wheels 6 and 7 are mounted to turn. The rear axle 8 is likewise provided with ground wheels 9 and 10. The spring members 11 are mounted on the ends of the front axle 5, and the spring members 12 are mounted on the ends of the rear axle 8. The vehicle body 13 is supported on the spring members 11 and 12 by means of the conventional levers or frame members 14 and 15, one of which is equipped with the usual handle 16.

The front axle is provided with one or more bearing straps 17 near each end thereof, and these straps pivotally connect the U-shaped rock shaft 18 to the front axle. The rear axle is provided with a bearing strap 19 near each end, and the U-shaped rock shaft 20 is pivotally connected to the rear axle by these bearing straps.

The rock shaft 18 is provided with hanger lever arms 18a and 18b, which are pivotally connected to the runners 21 and 22, and the rock shaft 20 is provided with hanger lever arms 20a and 20b, which are pivotally connected to the same runners 21 and 22.

A V-shaped member 23, having downwardly and outwardly divergent arms 23a and 23b, has pivotal connection by these arms with the outer ends of the lever arms 18a and 18b of the rock shaft 18. An operating bar 24 extends from the point of junction of the arms 23a and 23b and is rigidly connected thereto, and is pivotally connected to the supporting link 25, which is pivotally connected at its upper end to the bracket arm 26, carried by the rear axle 8. The outer end of the bar 24 is provided with a handle 24a.

The rock shaft 20 is equipped with lever arm 27, which is rigidly connected thereto, as by welding or otherwise, and this lever arm is provided with a handle 27a. By operating this lever arm the operating bar 24 may be locked against the axle in either position it may be moved to.

Figure 2:
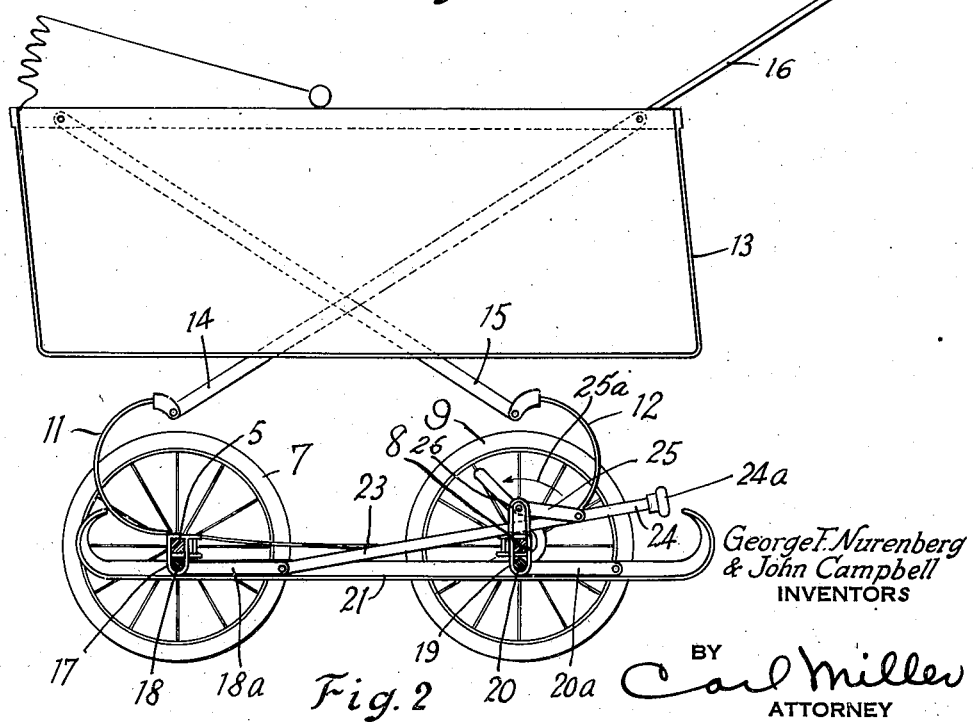
Fig. 2 is a similar view, showing the runners in a raised or inoperative position.

Figs. 1 and 2 show the runners in operative and inoperative position, respectively. In order to shift the runners from their inoperative position (Fig. 2) into their operative position (Fig. 1) it is merely necessary to pull the operating bar 24 to a point in which the longitudinal axis of the bar 24 and of the link 25 assume parallel positions, thereby turning the link 25 counterclockwise in the direction of the arrow 25a (Fig. 2) upon its fixed axle pivot and then to push the operating bar 24, thereby continuing the turning of link 25 counterclockwise and at the same time turning clockwise upon their axle pivots the rockshafts 18 and 20 together with the hanger lever arms 18a, 18b, 20a and 20b until the runners 21 and 22 engage the ground. Upon operating now the lever arm 27 in clockwise direction the rock shaft 20 is turned thereby lifting the running gear of the carriage until the bar 24 abuts the rear axle 8. Since it is necessary to lift the bar 24 which is locked by the weight of the carriage into the rear axle abutting position (Fig. 1) in order to shift the runners into inoperative position, an involuntary lifting of the runners 21 and 22 is impossible. Likewise are the runners maintained in operative position by abutting the bar 24 against the rear axle 8, thereby locking the runners in inoperative position, because a slight lifting of the runners is required in order to shift the latter into operative position and the weight of the runners maintains the locked inoperative position.

By depressing the runners, as shown in Fig. 1, they will lift the ground wheels above the ground and form the only means of traction between the vehicle and the ground. When the vehicle must be moved over ice and snow the runners thus provide a sled accessory for the vehicle, and when it is desired to use the ground runners to prevent accidental movement of the vehicle, the runners act as ground brakes, and will effectively resist sliding over normal ground surfaces.

The invention may be applied to all types of road vehicles, either hand pushed or drawn, or motor or animal drawn or pushed. When the runners are in raised position the ground wheels have complete freedom of movement. By pushing the operating bar or foot pedal bar inwardly the runners can be forced into ground engaged position, thereby lifting the ground wheels from the ground.

It is understood that various changes in the details of construction, their combination and arrangement, may be made, within the scope of the invention, as defined by the claim herein set forth.

Having described the invention, we claim as new:

In a vehicle, a front and a rear axle, a rock shaft pivoted on each axle and provided with end lever arms, parallel sled runners disposed on each side of the vehicle parallel to the longitudinal axis thereof and pivotally connected to the ends of the lever arms, a V-shaped member pivotally connected to the lever arms of one of the rock shafts, an operating bar rigidly connected to said V-shaped member, a link, one end of said link pivotally connected to said rear axle and the other end of said link pivotally connected to the operating bar, a lever secured to the rock shaft provided on the rear axle, said operating bar being adapted to shift the said runners from inoperative position into operative position by lifting the said bar from a locking rear axle engaging position and thereby at first slightly lifting said runners before starting their downward movement to a ground engaging position whereupon operation of said lever turns the rear rocking shaft until the operating bar abuts the rear axle, thereby lifting the vehicle and shifting the runners into final operative position, in which the vehicle weight locks said runners in operative position.

GEORGE F. NURENBERG.
JOHN CAMPBELL.

REFERENCES CITED

The following references are of record in the file of this patent:

UNITED STATES PATENTS

| Number | Name | Date |
| --- | --- | --- |
| 384,494 | Baker | June 12, 1888 |
| 572,059 | Minniss | Nov. 24, 1896 |
| 900,937 | Korff | Oct. 13, 1908 |
| 1,205,842 | Belliveau | Nov. 21, 1916 |